United States Patent [19]

Gibbons et al.

[11] 4,048,126

[45] Sept. 13, 1977

[54] PROCESS FOR PRODUCING CARBOHYDRATE-PHENOL CONDENSATION RESINS

[75] Inventors: John P. Gibbons, Western Springs; Lawrence Wondolowski, Downers Grove, both of Ill.

[73] Assignee: CPC International Inc., Englewood Cliffs, N.J.

[21] Appl. No.: 707,598

[22] Filed: July 22, 1976

[51] Int. Cl.$^2$ .............................................. C08L 3/02
[52] U.S. Cl. ...................................... 260/17.2; 260/38
[58] Field of Search ........................................ 260/17.2

[56] References Cited

U.S. PATENT DOCUMENTS

| | | | |
|---|---|---|---|
| 1,107,107 | 8/1914 | Pollak | 260/17.2 |
| 1,820,816 | 8/1931 | McIntosh | 260/17.2 |
| 1,832,038 | 11/1931 | Meigs | 260/17.2 |
| 1,868,215 | 7/1932 | Meigs | 260/17.2 |
| 1,868,216 | 7/1932 | Meigs | 260/17.2 |
| 1,886,353 | 11/1932 | Novotny et al. | 260/17.2 |
| 1,923,321 | 8/1933 | Meigs | 260/17.2 |
| 2,069,178 | 1/1937 | Dent et al. | 260/17.2 |
| Re. 26,881 | 5/1970 | Kreibich et al. | 260/17.2 |

OTHER PUBLICATIONS

A.P.C. (Publication), Application of Kruyff, Ser. No. 306,583, published Apr. 20, 1943.

*Primary Examiner*—Edward M. Woodberry
*Attorney, Agent, or Firm*—David H. LeRoy; John P. Floyd

[57] ABSTRACT

A process for the production of carbohydrate-phenolic resins wherein a phenolic compound is reacted with a hexose saccharide in the presence of a Lewis acid catalyst to form a solid fusible resin which is curable with cross linking agents, such as hexamethylenetetramine.

13 Claims, No Drawings

PROCESS FOR PRODUCING CARBOHYDRATE-PHENOL CONDENSATION RESINS

This invention relates to carbohydrate-based condensation resins, and more particularly to a process for producing carbohydrate-based condensation resins in the presence of an improved catalyst system.

Condensation resins based upon phenol and aliphatic aldehydes have been used for many years in the plastics industry. As is now well established, the aldehyde, usually formaldehyde, is reacted with phenol in the presence of an acid or basic catalyst to form a condensation resin. The formaldehyde serves as a coupling agent, interconnecting the phenol or urea molecules.

For example, in a phenol-formaldehyde resin, the polymeric matrix includes the following groups:

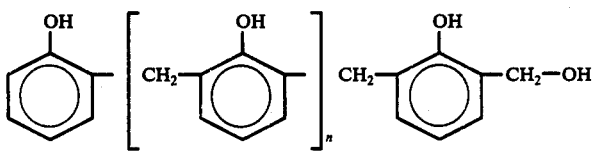

wherein $n$ is related to the molecular weight of the resin.

The basic raw material for condensation resins of the type described above is petroleum. As is now well known, supplies of petroleum are becoming increasingly limited, and prices have increased significantly. There is thus a need to replace at least a portion of the petroleum-based components of condensation resins of the type described above with a less expensive, more abundant material. Carbohydrates, readily available from plant sources, are thus one type of renewable resource ideally suited for use in the manufacture of plastics.

It has been proposed, as described in U.S. Pat. Nos. 1,593,342, 1,753,030, 1,801,052, 1,868,216 and 1,923,321, to employ carbohydrates, such as dextrose, starch and the like, in phenol condensation resins whereby the carbohydrate, in effect, is substituted for a portion of the petroleum-based material, usually phenol. However, resins of the sort described in the foregoing patents are, for the most part, prepared by reaction of the carbohydrate with phenol, occasionally in the presence of an aldehyde or a nitrogen-containing compound such as aniline.

The catalyst system most frequently used in the formation of phenol-formaldehyde novolak resins are strong mineral acids, such as sulfuric acid, hydrochloric acid, etc., or organic acids including carboxylic acids (such as oxalic acid) or sulfonic acids (such as paratoluene sulfonic acid). While such catalyst systems are effective in promoting the reaction between the phenolic compound and the carbohydrate, it has been found that the resin produced sets up very rapidly, characterized by a high viscosity. This represents a significant disadvantage because it is difficult to remove the resin from the reaction vessel at the completion of the reaction, and power consumption by mixing equipment is drastically increased as the reaction proceeds. It is thus desirable to provide a method for producing such resins without large increases in the viscosity of the reaction mixture.

It is accordingly an object of the present invention to provide a process for producing carbohydrate-based phenolic resins wherein a carbohydrate is employed at relatively high levels to decrease the cost of the resin system in the presence of a catalyst capable of affording control of the viscosity of the reaction mixture.

It is a more specific object of the invention to provide a process for producing carbohydrate-phenolic resins, using a catalyst system wherein the viscosity of the reaction mixture remains at relatively low levels to produce a resin having good strength properties and water resistance and which can be cured for use in thermoset molding applications.

The concepts of the present invention reside in a process for producing a carbohydrate-phenolic resin wherein dextrose or a polysaccharide capable of being hydrolyzed to form dextrose and a phenolic compound are reacted in the presence of a Lewis acid catalyst in the form of a metal salt. It has been found in the practice of this invention that such Lewis acid catalysts are capable of promoting the reaction between carbohydrate and the phenolic compound to produce a solid fusible resin, in a reaction in which the viscosity remains at a relatively low level during condensation, as compared to catalysts of the prior art. The solid fusible resin produced in the practice of this invention can thus be efficiently and economically produced, and is characterized by relatively high levels of carbohydrate without a concomitant sacrifice in the physical properties of the resin.

In the preferred practice of this invention, the Lewis acid catalyst is a salt of either aluminum or tin. The anion forming the particular salt is not critical to the practice of this invention, and thus use can be made of a variety of aluminum, zinc and/or tin salts. Preferred are the chlorides, bromides, iodides, fluorides, nitrates, sulfates, i.e. salts derived from strong mineral acids. In addition, use can also be made of metal salts of organic carboxylic acids containing 1 to 8 carbon atoms, including formates, acetates, propionates, etc., although such organic salts are not as effective.

Not only does the catalyst system of this invention serve to maintain the viscosity of the reaction mixture at a relatively low level, it also serves to regulate the water of condensation produced. For example, it has been found that, with sulfuric acid as a catalyst to promote the reaction between a phenolic compound and a carbohydrate, the amount of water of condensation collected during the course of the reaction tends to decrease to an amount less than the theoretical amount as the reaction proceeds. The catalyst employed in the practice of this invention promotes the reaction to proceed essentially to completion as measured by water of condensation, without substantially increasing the viscosity of the reaction product and without deleteriously affecting the water resistivity of the final resin.

Without limiting the invention as to theory, it is believed that, using dextrose as illustrative of the carbohydrate, the carbohydrate reacts with the phenolic compound to form a furan-type resin as represented by the following equation:

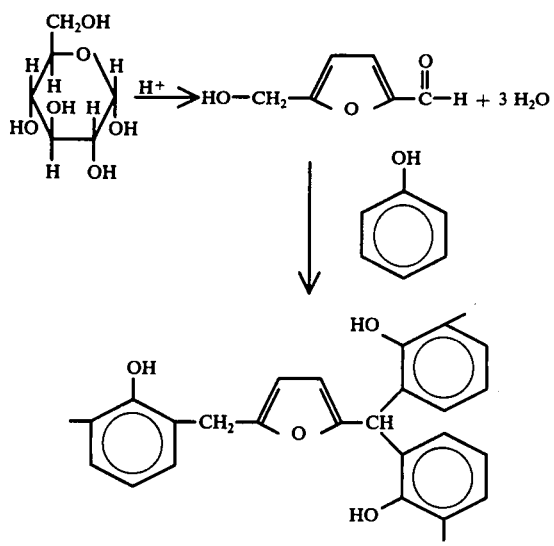

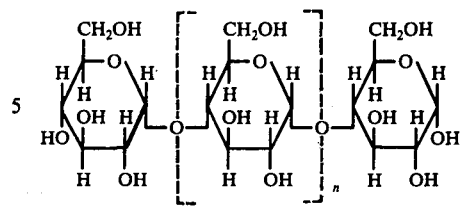

wherein n, designating the number of repeating units, can range from 0 to $1 \times 10^6$. Suitable starches include cereal starches such as corn starch, grain sorghum and wheat starches, waxy starches such as waxy milo starch and waxy maise starch and root starches such as potato starch and tapioca starch.

As the phenolic compound used in the practice of this invention, preferred are the phenolic compounds having the formula:

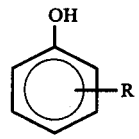

To the extent that condensation of the phenol with hydroxymethylfurfural (HMF) is incomplete, the reaction is believed to form

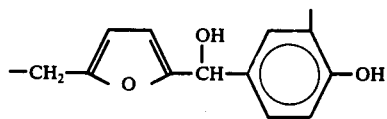

wherein R is a group selected from $C_1$ to $C_3$ alkyl, $C_1$ to $C_3$ alkoxy, halogen, hydroxy and hydrogen. The preferred phenolic compound is phenol, but other phenolic compounds include cresol, chlorophenol, bromophenol, resorcinol and the like.

The relative proportions of reactants employed in the practice of this invention can be varied within relatively wide limits. One of the advantages of the present invention stems from the fact that use can be made of one mole of the carbohydrate for every mole of phenol employed, although it will be understood that, if desired, use can also be made of greater amounts of phenol. In general, The amount of phenol employed ranges from 0.5 to 5 moles of phenolic compound for each mole of carobhydrate employed, and preferably 1 to 3.0 moles of phenolic compound per mole of carbohydrate.

As will be appreciated by those skilled in the art, the phenol may be bonded to the polymeric matrix at the ortho or para positions; the phenolic group also serves as a basic for branching to form a relatively high molecular weight material.

As can be seen from the foregoing reaction, for every mole of dextrose, three moles of water are liberated in the dehydration to HMF and two moles in the condensation reaction.

The postulated reaction mechanism thus requires the use of a hexose as the carbohydrate employed to provide the methyl furfural linkages between the phenolic groups. The postulated reaction mechanism, therefore, is much different from that which occurs in U.S. Pat. No. 1,797,593 wherein pentosans are reacted with phenol in the presence of sulfur monochloride and anitmony chlorides. The process of that patent, according to the inventors, does not include furfural as an intermediate in the reaction.

In the practice of this invention, the preferred carbohydrate is dextrose, although a variety of other carbohydrates which hydrolyze to form dextrose can be used as desired. Included are maltose, maltotriose, lactose, sucrose, glycogen, glucosides, mixtures thereof (such as corn syrup) and the like. Other renewable resources can likewise be used; for example, cellulose can be hydrolyzed by the enzyme cellulase to form starting materials used in the practice of this invention.

Included as the carbohydrate useful in the practice of this invention are the various starches containing many repeating dextrose units and their hydrolytic derivatives. Such starches and derivatives can be represented by the structure:

The relative proportions of the catalyst employed in the practice of this invention can be varied within relatively wide limits. Generally, the amount of catalyst employed is an amount sufficient to promote the desired reaction. Best results are usually obtained when the amount of catalyst ranges from 0.1 to about 10% by weight, based upon the weight of the carbohydrate. As will be appreciated by those skilled in the art, the amount of catalyst employed depends somewhat on the reaction temperature and the reaction time. Best results are usually achieved using reaction temperatures ranging from 70°-200° C for reaction times ranging from 30 minutes to 10 hours.

The resulting solid, fusible resin can be recovered from the reaction medium in a conventional manner. It is a brittle material at room temperature, and can be rendered thermosetting by addition of a suitable cross linking agent, such as hexamethylenetetramine. The resins thus produced in the practice of the invention find widespread use as molding and foundry resins. They are characterized by excellent water resistance and improved properties, particularly tensile strengths. In the use of such resins, the resin is preferably blended with suitable fillers (i.e. wood flour, silica, alumina, asbestos, glass fibers and particularly chopped glass fibers, etc.) and molded in accordance with conventional techniques.

It will be appreciated by those skilled in the art that various additives can be made to the reaction mixture. For example, it has been found that the addition of fatty acid amines, preferably containing 12 to 22 carbon atoms, can be added to the reaction vessel during the reaction to further increase water resistance and final thermoset resin moldability. For this purpose, use can be made of a variety of fatty acid amines commercially available, including, for example, ARMEEN T-Tallow amine, a long chain fatty acid amine from Armak.

In accordance with another embodiment of the invention, the Lewis acid catalyst may be formed in situ by adding to the reaction mixture an oxide of the metal along with a mineral acid such as sulfuric acid or hydrochloric acid to form the corresponding sulfate or chloride, respectively. For this purpose, use can be made of the oxides of aluminum, zinc and tin. It is generally sufficient to add acid in an amount sufficient to completely convert the oxide to its corresponding metal salt; it then catalyzes the reaction.

This invention is further illustrated by the following examples, which, however, are not to be taken as limiting in any respect. All part and percentages, unless expressly stated to be otherwise, are by weight.

EXAMPLE 1

This example is provided for purposes of comparison, and illustrates the use of a sulfuric acid catalyst as employed by the prior art.

To a 500 ml reaction flask is charged: 180 g dextrose, 208 g phenol (90% dry basis) and 8.2 g - 5 N $H_2SO_4$. The vessel is equipped with a stirrer, thermometer and condenser. The condensation reaction runs over a period of 7.6 hours while collecting 90 ml of water (92.0% of theoretical based on hydroxymethylfurfural - HMF formation). Temperature of the reaction varied from 118° C to 152° C while the viscosity increased from less than 350 cps initially to greater than 100,000 cps at the termination of the reaction.

A total of 300 g of the product, a black, brittle, fusible solid at room temperature, is recovered.

EXAMPLE 2

This example illustrates the practice of this invention, using tin chloride as the Lewis acid catalyst.

The reaction is carried out in a 500 ml reaction flask charged with the following ingredients: 180 g dextrose, 208 g phenol (90% d.b.) and 10.2 g of $SnCl_4.5H_2O$ catalyst. During the course of the condensation reaction, 4 hours, the temperature ranges from 112° C to 142° C while collecting 104.5 ml of water (100+% of theoretical based on HMF formation). The viscosity during the reaction increases only slightly from less than 350 cps initially to approximately 500 cps at the end of the condensation.

A yield of 276 g of a black, brittle resin at room temperature is obtained.

EXAMPLE 3

A reaction similar to Example 2 is conducted substituting starch for dextrose in the condensation reaction. A 500 ml reaction flask is charged with 184 g starch 3005, 214 g phenol (88% d.b.) and 2.6 g $SnCl_4.0.5H_2O$.

The condensation reaction occurs over a period of 9 hours collecting 100.5 ml of $H_2O$ (essentially theoretical amount based on HMF). During the reaction, the temperature varies from 116° C to 151° C while the viscosity remains essentially constant throughout at less than 350 cps.

A black, brittle fusible resin at room temperature is obtained in good yield.

EXAMPLE 4

As in Example 2, the following ingredients are added to a 500 ml reaction flask using $AlCl_3$ as the catalyst: 180 g dextrose, 204 g phenol (90% d.b.) and 1.84 g $AlCl_3$. During the condensation reaction. 98.5 ml of water is collected over a period of 3 hours while the temperature is maintained from 122° C to 150° C. Again, as in the previous example at the elevated reaction temperature, there is essentially no increase in viscosity from the initial level of less than 350 cps, while at room temperature, the product (yield of 278 g) is a black, brittle, fusible solid.

The data from Examples 1-4, showing the effect of the metallic acid catalysts used in the practice of this invention on the viscosity of the reaction product is set forth in the following table.

TABLE 1

| Water of Condensation (Based on Hydroxy-methylfurfural) % | Example No. | | | |
|---|---|---|---|---|
| | 1 ($H_2SO_4$ Control) | 2 ($SnCl_4$ Dextrose) | 3 ($SnCl_4$ Starch) | 4 ($AlCl_3$ Dextrose) |
| | Viscosity (cps) at Reaction Temperature (<150° C) | | | |
| 0 | <350 | <350 | <350 | <350 |
| 20 | <350 | <350 | <350 | <350 |
| 40 | <350 | <350 | <350 | <350 |
| 60 | 350+ | <350 | <350 | <350 |
| 80 | 1,900+ | <350 | <350 | <350 |
| 92 | 100,000+ | — | — | — |
| 100 | — | 500 | <350 | <350 |

As can be seen from that data, the use of Lewis acid catalysts in the practice of this invention provides a viscosity significantly lower than that obtained from surfuric acid as a catalyst, in accordance with the prior art.

EXAMPLE 5

Each of the resins produced in Examples 1-4 is compounded with a filler, lubricants and the like along with hexamethylenetetramine as a curing agent in accordance with the following recipe:

| | Parts by Weight |
|---|---|
| Resin | 48.0 |
| Wood Flour | 48.0 |
| Hexamethylenetetramine | Variable |
| Calcium Stearate | 2.0 |
| Calcium Oxide | 2.0 |

The resulting compound is then milled at 200° F for 2 minutes and pressed into bars at 350° for 5 minutes.

The physical properties of the test bars were then measured, and the results are shown in the following table.

TABLE 2

| Example No. | Catalyst | Hexa, % | Water Resistance | | | | Flexural Modulus psi × 10⁵ |
|---|---|---|---|---|---|---|---|
| | | | 2 Hr. Boiling Water | | 24 Hr. Immersion | | |
| | | | % H₂O Absorbed | % Weight Loss | % H₂O Absorbed | % Weight Loss | |
| 1 | H₂SO₄ | 7 | 2.83 | 0.04 | 0.99 | +0.11 | 11.2 |
| | | 10 | 2.28 | +0.16 | 0.90 | +0.11 | 11.0 |
| | | 20 | 2.95 | 0.31 | 1.13 | +0.08 | 10.8 |
| 2 | SnCl₄ | 7 | 4.76 | 1.82 | 1.39 | 0.15 | — |
| | | 10 | 4.36 | 1.49 | 1.08 | 0.07 | 11.4 |
| | | 20 | 4.02 | 1.76 | 1.20 | 0.16 | 11.6 |
| 3 | SnCl₄ | 7 | 3.78 | 0.23 | 0.93 | 0.10 | 11.2 |
| | | 10 | 3.48 | 0.70 | 0.84 | 0.09 | 11.8 |
| | | 20 | 3.19 | 1.27 | 1.57 | 0.34 | 10.4 |
| 4 | AlCl₃ | 7 | 3.02 | 0.14 | 0.77 | 0 | 10.7 |
| | | 10 | 2.36 | 0.09 | 0.70 | 0 | 10.6 |
| | | 20 | 2.70 | 0.20 | 1.11 | 0 | 10.3 |

The foregoing data demonstrates that the catalysts employed in the practice of this invention provide good physical properties.

EXAMPLE 6

This example illustrates the alternative embodiment of the present invention wherein the catalyst is formed in situ by reaction of zinc oxide and sulfuric acid.

To a 500 ml reaction flask is charged 180 g dextrose, 204 g phenol (92% d.b.), 1.84 g ZnO and 3.8 g - 5 N H₂SO₄. After 2.2 hours, an additional 3.8 ml of 5 N H₂SO₄ is added to the reaction to increase the reactivity - approximately 37 ml of water of condensation is collected. Upon reacting for an additional 4.5 hours, the reaction again becomes somewhat sluggish necessitating the addition of 2.4 g of 5 N H₂SO₄ providing an essentially equivalent molar ratio of H₂SO₄ to ZnO (0.025 H₂SO₄/0.023 ZnO) - 67 ml H₂O is collected. The reaction is then continued for 3.8 hours collecting a total of 80 ml of H₂O, whereby an additional 7.6 g of 5 N H₂SO₄ is added to provide an excess molar ratio of H₂SO₄ over ZnO. A total of 109.5 ml of H₂O is collected over the course of reaction (92+ % of theoretical based on elimination of 5 moles of H₂O per mole of dextrose). The viscosity during the reaction remains essentially unchanged at 350 cps while the temperature varies from 132° to 152° C. The resulting product (a theoretical yield of a black, brittle solid at room temperature) is compounded, milled, pressed and tested for water resistance and strength properties.

| Theoretical Water of Condensation (Based on Elimination of 5 Moles of H₂O Per Mole of Dextrose), % | Viscosity (cps) at Reaction Temperature |
|---|---|
| 0 | 350 |
| 20 | 350 |
| 40 | 350 |
| 60 | 350 |
| 80 | 350 |
| 92+ | 350 |

While the invention has been described in connection with specific embodiments thereof, it will be understood that it is capable of further modification, and this application is intended to cover any variations, uses, or adaptions of the invention following, in general, the principles of the invention and including such departures from the present disclosure as come within known or customary practice in the art to which the invention pertains and as may be applied to the essential features hereinbefore set forth, as fall within the scope of the invention.

We claim:
1. A process for producing a carbohydrate-phenolic resin comprising reacting
   1. dextrose or a carbohydrate which hydrolyzes to form dextrose, and
   2. a phenolic compound having the formula

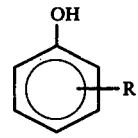

wherein R is selected from the group consisting of C₁ to C₃ alkyl, C₁ to C₃ alkoxy, halogen, hydroxy and hydrogen, in the presence of a metal salt Lewis acid catalyst to form a solid, fusible resin, and separating the resin from the reaction mixture.
2. A process as defined in claim 1 wherein the Lewis acid catalyst is selected from the group consisting of salts of aluminum, zinc and tin.
3. A process as defined in claim 1 wherein the catalyst is tin chloride.
4. A process as defined in claim 1 wherein the catalyst is aluminum chloride.
5. A process as defined in claim 1 wherein the phenolic compound is phenol.
6. A process as defined in claim 1 wherein the carbohydrate is starch.

| Example No. | Catalyst | Hexa, % | Water Resistance | | | | Flexural Modulus psi × 10⁵ |
|---|---|---|---|---|---|---|---|
| | | | 2 Hr. Boiling Water | | 24 Hr. Immersion | | |
| | | | % H₂O Absorbed | % Weight Loss | % H₂O Absorbed | % Weight Loss | |
| 6 | ZnO {H₂SO₄} | 7 | 4.38 | 1.22 | 1.28 | 0.04 | 11.2 |
| | | 10 | 3.76 | 0.81 | 1.20 | +0.06 | 10.7 |
| | | 20 | 3.53 | 1.12 | 1.79 | 0.11 | 10.3 |

7. A process as defined in claim 1 which includes the step of curing the solid, fusible resin with a cross linking agent to render the solid thermosetting.

8. A process as defined in claim 1 wherein (a) is dextrose.

9. A process as defined in claim 1 wherein the dextrose or carbohydrate which hydrolyzes to form dextrose is selected from the group consisting of starches and their hydrolysis products having the formula:

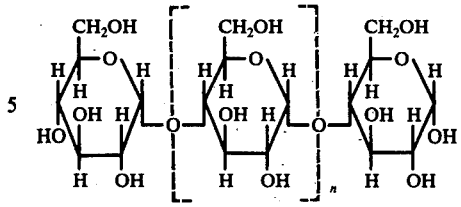

wherein $n$ is 0 to $1 \times 10^6$.

10. A process as defined in claim 1 wherein the phenolic compound is employed in an amount within the range from 0.5 to 5 moles of phenolic compound for each mole of dextrose or carbohydrate which hydrlyzes to form dextrose.

11. A process as defined in claim 1 wherein the reaction is carried out at a temperature ranging from 70° to 200° C.

12. A carbohydrate-phenolic resin produced by the process defined in claim 1.

13. A process as defined in claim 1 wherein the catalyst is formed in situ by reaction of a mineral acid with an oxide of said metal.

* * * * *